United States Patent
Lee et al.

(10) Patent No.: US 10,461,351 B2
(45) Date of Patent: Oct. 29, 2019

(54) POLYMER ELECTROLYTE MEMBRANE FOR FUEL CELL, MEMBRANE-ELECTRODE ASSEMBLY FOR FUEL CELL INCLUDING SAME, AND FUEL CELL INCLUDING SAME

(71) Applicant: Seoul National University R&DB Foundation, Seoul (KR)

(72) Inventors: Jong-Chan Lee, Seoul (KR); Kihyun Kim, Seoul (KR); Jungmoon Bae, Seoul (KR); Pil Won Heo, Yongin (KR); Jun-Young Kim, Yongin (KR); Tae-Yoon Kim, Yongin (KR); Chan Ho Pak, Yongin (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 273 days.

(21) Appl. No.: 15/340,019

(22) Filed: Nov. 1, 2016

(65) Prior Publication Data

US 2017/0149081 A1 May 25, 2017

(30) Foreign Application Priority Data

Nov. 19, 2015 (KR) ........................ 10-2015-0162866

(51) Int. Cl.
- *H01M 8/1037* (2016.01)
- *H01M 8/1004* (2016.01)
- *H01M 8/1027* (2016.01)
- *H01M 8/1018* (2016.01)
- *H01M 8/1007* (2016.01)

(52) U.S. Cl.
CPC ....... *H01M 8/1037* (2013.01); *H01M 8/1004* (2013.01); *H01M 8/1007* (2016.02); *H01M 8/1027* (2013.01); *H01M 2008/1095* (2013.01); *H01M 2300/0082* (2013.01)

(58) Field of Classification Search
CPC ....... H01M 2008/1095; H01M 8/1004; H01M 8/1007; H01M 8/1027; H01M 8/1037
See application file for complete search history.

(56) References Cited

U.S. PATENT DOCUMENTS

| | | | |
|---|---|---|---|
| 2007/0190385 A1* | 8/2007 | Lee | .................. C08J 5/2275 429/483 |
| 2011/0120940 A1* | 5/2011 | Allen | .................. B01D 69/12 210/500.35 |
| 2013/0196248 A1* | 8/2013 | Kim | .................. H01M 8/1037 429/482 |

FOREIGN PATENT DOCUMENTS

| | | |
|---|---|---|
| KR | 10-2007-0081936 | 8/2007 |
| KR | 10-2013-0093849 | 8/2013 |

(Continued)

OTHER PUBLICATIONS

Hao Jiang et al., "Cross-linked high conductive membranes based on water soluble ionomer for high performance proton exchange membrane fuel cells", Journal of Power Sources, 241, p. 529-535, May 13, 2013.

(Continued)

*Primary Examiner* — Mayla Gonzalez Ramos
(74) *Attorney, Agent, or Firm* — Lex IP Meister, PLLC

(57) ABSTRACT

A polymer electrolyte membrane for a fuel cell includes a cross-linking polymer in which a polyhedral oligomeric silsequioxane (POSS) is cross-linked with a hydrocarbon-based polymer and a membrane-electrode assembly for a fuel cell includes the polymer electrolyte membrane.

16 Claims, 10 Drawing Sheets

(56) References Cited

FOREIGN PATENT DOCUMENTS

KR    10-2013-0118075    10/2013
KR    10-2013-0118081    10/2013

OTHER PUBLICATIONS

Ye Li et al., "Proton conducting electrolyte membranes derived from novel branched sulfonated poly(ether ether ketone)s with benzimidazole sulfonic acid pendants via thiol-ene click chemistry", International Journal of Hydrogen Energy, 38, p. 16276-16285, Nov. 1, 2013.
Andrew B. Lowe, "Thiol-ene "click" reactions and recent applications in polymer and materials synthesis", Polymer Chemistry, 1, p. 17-36, Nov. 25, 2009.

* cited by examiner

POLYMER ELECTROLYTE MEMBRANE FOR FUEL CELL, MEMBRANE-ELECTRODE ASSEMBLY FOR FUEL CELL INCLUDING SAME, AND FUEL CELL INCLUDING SAME

CROSS-REFERENCE TO RELATED APPLICATION

This application claims priority to and the benefit of Korean Patent Application No. 10-2015-0162866 filed in the Korean Intellectual Property Office on Nov. 19, 2015, the entire contents of which are incorporated herein by reference.

BACKGROUND

Field

A polymer electrolyte membrane for a fuel cell and a membrane-electrode assembly for a fuel cell including the same are disclosed.

Description of the Related Art

As interest in environment and energy depletion has increased, more research and development have been concentrated on commercialization of a fuel cell as an environmentally-friendly and renewable energy source. A polymer electrolyte membrane fuel cell (PEMFC) has been recognized as a promising system capable of replacing a conventional energy-transforming element due to high efficiency, high output density, a low operation temperature and environmentally-friendly characteristics.

However, there are various technical limits for more commercialization, the polymer electrolyte membrane fuel cell (PEMFC) needs to be improved in terms of high performance, cycle-life, low cost, and the like. Herein, a membrane-electrode assembly (MEA) shows improvement of a polymer electrolyte membrane fuel cell, and specifically, a polymer electrolyte membrane essentially is one of the essential factors having an influence on performance and cost of the membrane-electrode assembly (MEA).

The polymer electrolyte membrane for operating the polymer electrolyte membrane fuel cell (PEMFC) requires high proton conductivity, chemical stability, low fuel permeation, high mechanical strength, low moisture content, excellent dimensional stability, and the like, but a conventional polymer electrolyte membrane may not realize high performance in an environment of high temperature and low humidity. Accordingly, the conventional polymer electrolyte membrane tends to limit the use of the membrane-electrode assembly (MEA) and the polymer electrolyte fuel cell (PEMFC).

A fluorine-based polymer electrolyte membrane such as Nafion known to presently show the most excellent performance has the technological obstacle of complex manufacturing process, reduced efficiency according to permeation of a fuel, high cost, and the like, and a hydrocarbon-based polymer electrolyte membrane developed as its alternative also has a technological obstacle due to a problem of low proton conductivity under a high temperature/low humidity condition, mechanical durability under a repetitive wet/dry condition, and the like. Accordingly, research and development of the polymer electrolyte membrane as one of essential elements consisting of the membrane-electrode assembly having the most influence on commercialization of the polymer electrolyte fuel cell are desperately required.

Accordingly, development of a polymer electrolyte membrane having excellent durability, solving a problem occurring under a high temperature/low humidity condition, and contributing to increasing characteristics of the membrane-electrode assembly is required, and particularly, development of a hydrocarbon-based polymer electrolyte membrane having excellent dimensional stability is necessary to improve performance and cycle-life characteristics of the membrane-electrode assembly under various operation conditions.

SUMMARY

One embodiment provides a polymer electrolyte membrane for a fuel cell having high performance and long cycle-life characteristics under a condition of high temperature and low humidity.

Another embodiment provides a membrane-electrode assembly for a fuel cell including the polymer electrolyte membrane for a fuel cell.

Yet another embodiment provides a fuel cell including the membrane-electrode assembly.

One embodiment provides a polymer electrolyte membrane for a fuel cell including a cross-linking polymer in which a polyhedral oligomeric silsequioxane (POSS) is cross-linked with a hydrocarbon-based polymer.

The polyhedral oligomeric silsequioxane may be represented by Chemical Formula 1 or 2.

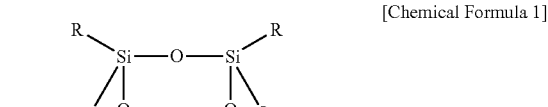

[Chemical Formula 1]

[Chemical Formula 2]

In Chemical Formula 1 or 2, R is Chemical Formula 1a.

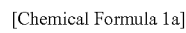

[Chemical Formula 1a]

In Chemical Formula 1a, * indicates a binding site where it is bound to Chemical Formula 1 or 2.

The cross-linking polymer may not have a peak in about 2400 cm$^{-1}$ to about 2800 cm$^{-1}$ at a FT-IR analysis.

The hydrocarbon-based polymer may have a weight average molecular weight (Mw) of about 20,000 to about 300,000.

The cross-linking polymer may have solubility for dimethylacetate of about 40 wt % to about 90 wt %.

The hydrocarbon-based polymer may be a polymer having at least one sulfonic acid group at a side chain.

The hydrocarbon-based polymer may have a degree of sulfonation of about 50% to about 100%.

The hydrocarbon-based polymer may include a repeating unit represented by Chemical Formula 3.

[Chemical Formula 3]

$$*-\left[\left(\bigcirc-\bigcirc\right)-A1-\bigcirc-D1-\bigcirc\right]_m-A2-\bigcirc-\bigcirc-A3\underset{Y}{\overset{Y}{\bigcirc}}-D2-\bigcirc\underset{Y}{\overset{Y}{\bigcirc}}-*_n$$

In Chemical Formula 3,

A1, A2, and A3 are the same or different and are independently O or S,

D1 and D2 are the same or different and are independently SO$_2$, O, or S,

Y is a substituted or unsubstituted proton conductive group, n is a real number of 0.2 to 1, and m is 1-n.

A thickness of the polymer electrolyte membrane may range from about 5 μm to about 20 μm.

An ion exchange capacity (IEC) of the polymer electrolyte membrane may range from about 1.5 meq/g to about 3.5 meq/g.

The cross-linking polymer may include about 5 mol % to about 40 mol % of the polyhedral oligomeric silsequioxane based on 100 mol % of the cross-linking polymer.

Another embodiment provides a membrane-electrode assembly for a fuel cell that includes a polymer electrolyte membrane; a cathode the polymer positioned on one side of the electrolyte membrane; and an anode positioned on the other side of the electrolyte membrane.

Another embodiment provides a fuel cell including at least one electricity generating element including the membrane-electrode assembly and separators positioned at both sides of the membrane-electrode assembly, and generating electricity through an oxidation reaction of a fuel and a reduction reaction of an oxidant; a fuel supplier for supplying the fuel to the electricity generating element; and an oxidant supplier for supplying an oxidant to the electricity generating element.

Other embodiments are included in the following detailed description.

A membrane-electrode assembly for a fuel cell having high performance and long cycle-life characteristics under a condition of high temperature and low humidity may be realized by applying the polymer electrolyte membrane for a fuel cell.

DETAILED DESCRIPTION

Hereinafter, embodiments are described in detail. However, these embodiments are examples, and this disclosure is not limited thereto.

As used herein, when specific definition is not otherwise provided, It will be understood that when an element such as a layer, film, region, or substrate is referred to as being "on" another element, it can be directly on the other element or intervening elements may also be present.

Hereinafter, a polymer electrolyte membrane for a fuel cell according to one embodiment is described.

Figure 1:
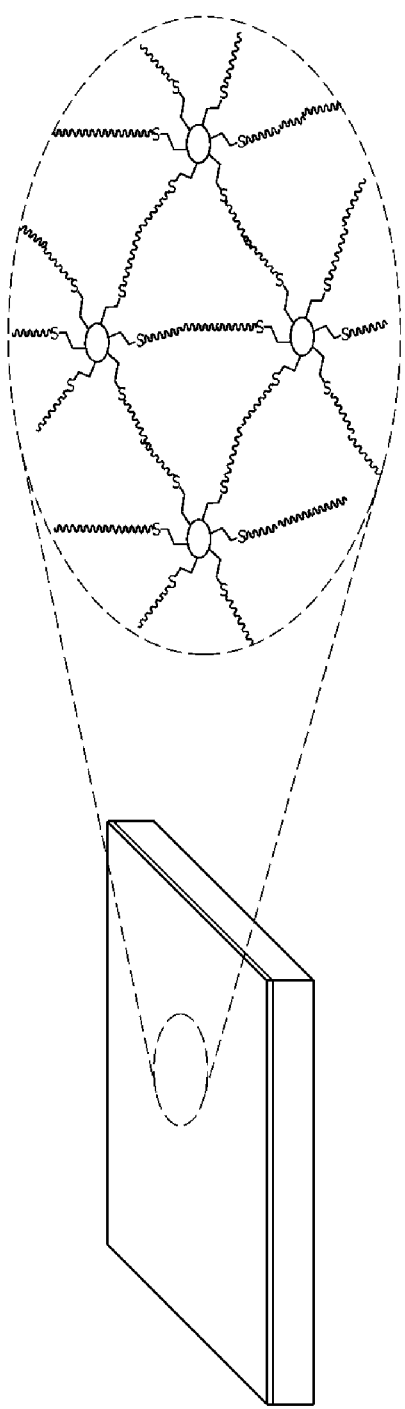
FIG. 1 schematically shows a combination of cross-linking polymers in a polymer electrolyte membrane for a fuel cell according to one embodiment.

A polymer electrolyte membrane for a fuel cell according to one embodiment includes a cross-linking polymer in which a polyhedral oligomeric silsequioxane (POSS) is cross-linked with a hydrocarbon-based polymer. FIG. 1 shows a schematic structure of the cross-linking polymer in the polymer electrolyte membrane. In FIG. 1, ○ indicates the polyhedral oligomeric silsequioxane and lines indicate the hydrocarbon-based polymer.

The polyhedral oligomeric silsequioxane may be represented by Chemical Formula 1 or 2.

[Chemical Formula 1]

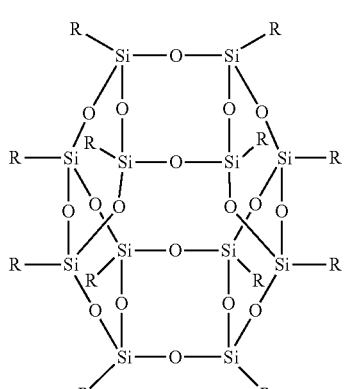

[Chemical Formula 2]

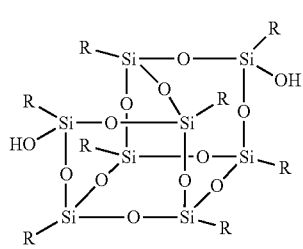

The cross-linking polymer may have solubility for dimethylacetate of about 40 wt % to about 90 wt %, for example about 45 wt % to about 90 wt %. The solubility may be obtained by measuring a solid content (wt %) included in the dimethylacetate by adding the cross-linking polymer to the dimethylacetate and then, maintaining the mixture for a predetermined time. The maintenance time may be in a range of about 1 hour to about 24 hours, and the measurement is performed at about 80° C. to about 25° C.

When the cross-linking polymer has solubility for the dimethylacetate within the range, the cross-linking polymer is almost not substantially dissolved in the dimethylacetate, and thus durability is improved.

Accordingly, when the cross-linking polymer has solubility for the dimethylacetate within the range, high chemical stability may be realized under a condition of operating a fuel cell.

In one embodiment, the hydrocarbon-based polymer may be a polymer having at least one proton conductive group at a side chain.

The proton conductive group may be a sulfonic acid group, a phosphoric acid group, a phosphonic acid group, an acrylate group, or a nitrile group.

The hydrocarbon-based polymer may include a repeating unit represented by Chemical Formula 3.

[Chemical Formula 3]

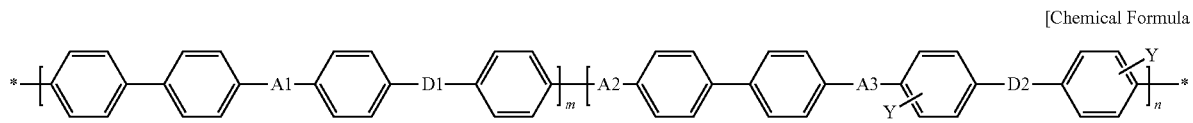

In Chemical Formula 1 or 2, R is Chemical Formula 1a.

[Chemical Formula 1a]

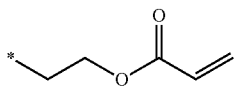

In Chemical Formula 1a, * indicates a binding site where it is bound to Chemical Formula 1 or 2.

The cross-linking polymer may not have a peak in about 2400 cm$^{-1}$ to about 2800 cm$^{-1}$ at a FT-IR analysis. Since a peak appearing at about 2400 cm$^{-1}$ to about 2800 cm$^{-1}$ during the FT-IR analysis is derived from a thiol group, the cross-linking polymer according to one embodiment shows no peak within the range and is confirmed to include no thiol group. The cross-linking polymer according to one embodiment is a cross-linking polymer in which a thiol group is well cross-linked with a carbon-carbon double bond in the hydrocarbon-based polymer having the thiol group at the terminal end and the polyhedral oligomeric silsequioxane having the carbon-carbon double bond, and good cross-linkage bond is clearly expected from no peak derived from the thiol group.

The hydrocarbon-based polymer may have a weight average molecular weight (Mw) of about 20,000 to about 300,000. When the hydrocarbon-based polymer has a weight average molecular weight within the range, a cross-linking structure may be introduced into a polymer regardless of the molecular weight of a polymer from a relatively low molecular weight to a high molecular weight.

In Chemical Formula 3,
A1, A2, and A3 are the same or different and are independently O or S,
D1 and D2 are the same or different and are independently SO$_2$, O, or S,
Y is a substituted or unsubstituted proton conductive group, for example SO$_3$H, H$_2$PO$_4$, HPO(OH), CH$_2$=CHCOO or CN,
n is a real number of 0.2 to 1, and
m is 1-n.

In the substituted or unsubstituted proton conductive group, at least one H of the substituted proton conductive group may be replaced by Na, K, Li, Cs or tetrabutyl ammonium.

Herein, a degree of substitution of a proton conductive group (for example, a degree of sulfonation) of the hydrocarbon-based polymer may be an integer ranging from 50 to 100. The degree of substitution of a proton conductive group in one embodiment indicates the mole number, n for a monomer having a substituent Y in Chemical Formula 3, and when the n is 0.67, the degree of sulfonation is 67. When the hydrocarbon-based polymer has a degree of substitution within the range, high proton conductivity may be realized.

The Chemical Formula 3 shows that the hydrocarbon-based polymer includes a first monomer based on the number of mole, m and a second monomer based on the number of mole, n as repeating units as shown in Chemical Formula 3, but, Chemical Formula 3 does not indicate only block copolymer of the first and second monomers. The hydrocarbon-based polymer according to one embodiment may be any polymer including the first monomer based on the number of mole, m and the second monomer based on the number of mole, n as shown in Chemical Formula 3 such as a random copolymer, the block copolymer, an alternating copolymer, and the like.

In addition, the hydrocarbon-based polymer may have a fluorine-based substituent at the terminal end of Chemical Formula 3.

The hydrocarbon-based polymer, for example, may be about 5 μm to about 20 μm thick. When the polymer electrolyte membrane has a thickness within the range, performance of a fuel cell may be improved by manufacturing a membrane-electrode assembly using the thinness of the polymer electrolyte membrane but minimizing gas permeation and thus reducing membrane resistance The polymer electrolyte membrane may have ion exchange capacity (IEC) in a range of about 1.5 meq/g to about 3.5 meq/g. When the polymer electrolyte membrane has ion exchange capacity within the range, performance of a membrane-electrode assembly and a fuel cell may be improved by effectively moving protons under a low humidity condition without deteriorating proton conductivity of the polymer electrolyte membrane under a high temperature/low humidity condition.

The cross-linking polymer may include about 5 mol % to about 40 mol % of the polyhedral oligomeric silsequioxane based on 100 mol % of the hydrocarbon-based polymer.

When the polymer electrolyte membrane according to one embodiment is applied to a fuel cell, the fuel cell may be operated under a low humidity condition of less than or equal to about 50%.

The polymer electrolyte membrane having the above constitution according to one embodiment may be manufactured through the following process.

The hydrocarbon-based polymer having at least one proton conductive group in the side chain may be bonded with the compound having the thiol group to substitute the terminal end of the hydrocarbon-based polymer with the thiol group.

The compound having a thiol group may be 4,4'-thiobisbenzenethiol, benzenedithiol, [1,1'-biphenyl]-4,4'-dithiol, or a combination thereof.

The hydrocarbon-based polymer having at least one proton conductive group at a side chain may include a repeating unit represented by Chemical Formula 3.

The compound having a thiol group may be used in an amount of about 200 mol % to about 400 mol % based on 100 mol % of the hydrocarbon-based polymer having at least one proton conductive group at a side chain. When the compound having the thiol group is used within the range, high cross-linking may be maintained by much increasing stability of an electrolyte membrane under the operation condition of a fuel cell.

The bonding reaction may be performed in a solvent, and herein, the solvent may be N-methylpyrrolidone, dimethyl acetamide, dimethylsulfoxide, or a combination thereof but is not limited thereto. In addition, the bonding reaction may be performed at about 60° C. to about 180° C. for about 4 hours to about 24 hours.

Furthermore, the bonding reaction may be performed by using a reaction catalyst, and the reaction catalyst may be $K_2CO_3$, $CaCO_3$, or a combination thereof.

In addition, the bonding reaction may further use sulfuric acid or hydrochloric acid. These acids may be used as an aqueous solution in a concentration of about 0.5 mol/L to about 2 mol/L.

Before the bonding reaction of the hydrocarbon-based polymer having at least one proton conductive group in the side chain with the compound having a thiol group, the hydrocarbon-based polymer having at least one proton conductive group in the side chain may be further reacted with a compound having a fluoro substituent. This reaction may be performed in a solvent. Herein, the solvent may be N-methylpyrrolidone, toluene, dimethyl acetamide, cyclohexane, dimethylsulfoxide, or a combination thereof, and when a mixture is used, a mixing ratio may be appropriately adjusted.

The reaction may produce a product having a fluoro substituent at the terminal end of the hydrocarbon-based polymer having at least one proton conductive group in the side chain, and the fluoro substituent may facilitate the bonding of the hydrocarbon-based polymer with the thiol group.

The compound having the fluoro substituent may be decafluoro biphenyl, hexafluorobiphenyl, difluorodiphenylsulfone, or a combination thereof.

The compound having the fluoro substituent may be used in an amount of about 200 mol % to about 400 mol % based on 100 mol % of the hydrocarbon-based polymer having at least one proton conductive group in the side chain.

The reaction with the compound having the fluoro substituent may be performed at about 80° C. to about 160° C. for about 12 hours to about 24 hours. The reaction with the compound having the fluoro substituent may be primarily performed at about 140° C. to about 150° C. for about 3 hours to about 5 hours and then, secondarily at about 170° C. to about 190° C. for about 12 hours to about 24 hours.

Furthermore, before the reaction with the compound having the fluoro substituent, the hydrocarbon-based polymer having at least one proton conductive group in the side chain may be further reacted with a biphenol-based compound such as 3-(3-hydroxyphenoxy)phenol and (1,1'-biphenyl)-4,4'-diol. This reaction may effectively support the above reaction with the compound having the fluoro substituent.

The biphenol-based compound may be used in an amount of about 1.5 mol to about 3 mols based on the amount of the hydrocarbon-based polymer.

Before the reaction with the biphenol-based compound, the compound having the fluoro substituent, may be further reacted with a material having at least one proton conductive group in the side chain may be further performed.

The compound having the fluoro substituent may be difluorodiphenyl sulfone and the like but is not limited thereto.

The material having at least one proton conductive group in the side chain may be sulfonated difluorodihalophenylsulfone natrium salt and the like but is not limited thereto.

The reaction may be performed in a solvent, and herein, the solvent may be N-methylpyrrolidone, toluene, or a combination thereof but is not limited thereto. In addition, the reaction may be performed at about 60° C. to about 180° C. for about 4 hours to about 24 hours.

In addition, the reaction may be performed by using a reaction catalyst, and herein, the reaction catalyst may be $K_2CO_3$, $CaCO_3$, or a combination thereof.

The hydrocarbon-based polymer substituted with the thiol group at the terminal end is mixed with polyhedral oligomeric silsequioxane. This mixture is thiol-ene reacted, that is, cross-linked, providing a cross-linking polymer obtained through cross-linking of the hydrocarbon-based polymer with the polyhedral oligomeric silsequioxane. The polyhedral oligomeric silsequioxane may play a role of a cross-linking agent during the mixing process, and herein, vinyl silica may be used as an additional cross-linking agent.

When the vinyl silica is additionally used, the vinyl silica may be appropriately used in a sufficient amount to effectively facilitate the cross-linking reaction without a particular limit in the amount.

The polyhedral oligomeric silsequioxane may be used in an amount of about 5 mol % to about 40 mol % based on 100 mol % of the hydrocarbon-based polymer substituted with the thiol group at the terminal end.

The cross-linking reaction may further use an initiator. Herein, the initiator may be azobisisobutyronitrile and the like but is not limited thereto.

The cross-linking reaction may be performed through a heat treatment after forming a film with the mixture. The heat treatment may be performed at about 100° C. to about 160° C. When the heat treatment is performed within the temperature range, the cross-linking reaction may smoothly occur in an appropriate level.

The preparation process of the hydrocarbon-based polymer substituted with the thiol group at the terminal end including all the aforementioned processes may be briefly summarized as follows.

A polymer having at least one proton conductive group in the side chain may be prepared by reacting a compound having biphenol, a fluoro substituent with a material having at least one alkyl group-containing proton conductive group in the side chain.

The polymer having at least one proton conductive group in the side chain is reacted with a biphenol-based compound such as 3-(3-hydroxyphenoxy)phenol and (1,1'-biphenyl)-4,4'-diol, preparing a polymer having a biphenolic group at both terminal ends and at least one proton conductive group in the side chain.

Subsequently, the polymer having a biphenolic group at both terminal ends and at least one proton conductive group in the side chain is reacted with a compound having a fluoro substituent, preparing a polymer having the fluoro substituent at both terminal ends and at least one proton conductive group in the side chain.

Subsequently, the polymer having the fluoro substituent at both terminal ends and at least one proton conductive group in the side chain (i.e., a hydrocarbon-based polymer having at least one proton conductive group in the side chain) is reacted with a compound having a thiol group, preparing a hydrocarbon-based polymer substituted with the thiol group at the terminal end.

The polymer electrolyte membrane according to one embodiment is a cross-linking type hydrocarbon-based polymer electrolyte membrane obtained by using a carbon double bond cross-linking agent and thus may improve mechanical characteristics (properties) without much deteriorating proton conductivity, and accordingly, performance may be improved due to thinness of the electrolyte membrane and processibility of a membrane-electrode assembly may also be improved, and resultantly, durability and particularly, dimensional stability of the membrane-electrode assembly may be much improved under a high temperature/low humidity condition. In addition, chemical stability of the polymer electrolyte membrane may be improved compared with a conventional electrolyte membrane.

Hereinafter, a membrane-electrode assembly for a fuel cell according to another embodiment is described referring to FIG. 2.

Figure 2:
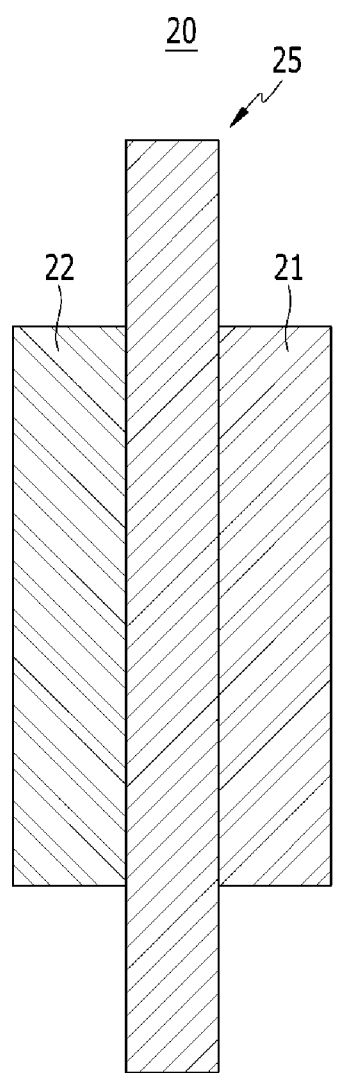
FIG. 2 is a schematic view showing a membrane-electrode assembly (MEA) for a fuel cell according to one embodiment.

FIG. 2 is a schematic view showing a membrane-electrode assembly (MEA) for a fuel cell according to one embodiment.

Referring to FIG. 2, a membrane-electrode assembly for a fuel cell 20 includes a polymer electrolyte membrane 25, a cathode 21 positioned on one side of the polymer electrolyte membrane 25, and an anode 22 positioned on the other side of the polymer electrolyte membrane 25.

The polymer electrolyte membrane 25 is the same as described above.

The cathode 21 and the anode 22 include an electrode substrate and a catalyst layer.

The catalyst layer may include platinum, ruthenium, osmium, a platinum-ruthenium alloy, a platinum-osmium alloy, a platinum-palladium alloy, a platinum-M alloy (M is at least one metal selected from Ga, Ti, V, Cr, Mn, Fe, Co, Ni, Cu, and Zn), or a combination thereof. The catalyst may be used singularly, or may be supported on a carrier. The carrier may include a carbon-based material such as graphite, denka black, ketjen black, acetylene black, carbon nanotube, carbon nano fiber, carbon nano wire, carbon nano ball, activated carbon, or so on, or an inorganic material particulate such as alumina, silica, zirconia, titania, or so on. The carbon-based material is generally used. When the catalyst includes a noble metal supported in on a carrier, it may include any one available in the market or one prepared by carrying a noble metal on a carrier. The process for supported a noble metal on a carrier is well known to those skilled in the art, so the details will be omitted from this detailed description.

The catalyst layer may further use carbon in addition to the catalyst for adherence improvement and proton transfer of the catalyst layer, or may further include an inorganic material particulate such as alumina, silica, titania, zirconia and the like. The catalyst layer may further include an ionomer for proton transferring properties.

The ionomer may be a polymer resin having proton conductivity, specifically a polymer resin having at least one cation an exchange group selected from a sulfonic acid group, a carboxylic acid group, a phosphoric acid group, a phosphonic acid group and a derivative thereof at its side chain. Specific examples of the polymer resin may be at least one polymer resin selected from a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer and a polyphenylquinoxaline-based polymer, and polymer resins having a cation exchange group in the side chain of the polymer resins. More specifically, examples of the polymer resin may be at least one polymer resin selected from poly(perfluorosulfonic acid), poly(perfluorocarboxylic acid), a copolymer including sulfonic acid group of tetrafluoroethylene and fluorovinylether, sulfide polyetherketone, aryl ketone, poly (2,2'-m-phenylene)-5,5'-bibenzimidazole and poly (2,5-benzimidazole), and polymer resins having a cation exchange group in the side chain of the polymer resins.

H of the cation exchange group can be replaced with Na, K, Li, Cs, or tetrabutyl ammonium in the terminal end of the side chain the polymer resins having proton conductivity. When H is substituted by Na in an ion exchange group at the terminal end of the side chain, NaOH is used. When H is replaced with tetrabutyl ammonium, tributyl ammonium hydroxide is used. K, Li, or Cs can also be replaced by using appropriate compounds. A method of substituting H is known in this related art, and thereby is not further described in detail.

The ionomer may be used singularly or as a mixture. Optionally, the ionomer may be used along with a non-conductive polymer to improve adherence between a polymer electrolyte membrane and the catalyst layer. The use amount of the non-conductive compound may be adjusted to its usage purpose.

Examples of the non-conductive compound may be at least one selected from polytetrafluoroethylene (PTFE), a tetrafluoroethylene-hexafluoropropylene copolymer (FEP), a tetrafluoroethylene-perfluoro alkylvinylether copolymer (PFA), an ethylene/tetrafluoroethylene (ETFE), an ethylenechlorotrifluoro-ethylene copolymer (ECTFE), polyvinylidene fluoride, a polyvinylidene fluoride-hexafluoropropylene copolymer (PVdF-HFP), dodecylbenzenesulfonic acid and sorbitol.

The ionomer may be included in an amount of about 15 wt % to about 50 wt %, for example, about 20 wt % to about 40 wt % based on the total amount of the catalyst layer. When the ionomer is included within the range, adherence of the catalyst layer and transfer efficiency of protons are improved.

The electrode substrate supports the electrode, and provides a path for diffusing reactants to the catalyst layer and may be referred to be a gas diffusion layer.

The electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. The fluorine-based resin may include polyvinylidene fluoride, polytetrafluoroethylene, fluorinated ethylene propylene, polychlorotrifluoroethylene, a fluoroethylene polymer, and the like.

A microporous layer (MPL) can be added between the aforementioned electrode substrate and catalyst layer to increase gas diffusion effects. The microporous layer may include a conductive powder having a small particle diameter, for example, a carbon powder, carbon black, acetylene black, activated carbon, a carbon fiber, fullerene, or carbon nanotube. The microporous layer is formed by coating a composition comprising a conductive powder, a binder resin, and a solvent on the gas diffusion layer. The binder resin may be polytetrafluoroethylene, polyvinylidene fluoride, polyvinyl alcohol, celluloseacetate, and the like, and the solvent may be an alcohol such as ethanol, isopropylalcohol, n-propylalcohol, and butanol, water, dimethyl acetamide, dimethylsulfoxide, N-methylpyrrolidone, and the like. The coating method may include, but is not limited to, screen printing, spray coating, doctor blade methods, gravure coating, dip coating, silk screening, painting, and so on, depending on the viscosity of the composition.

Another embodiment provides a fuel cell system includes at least one electricity generating element, a fuel supplier, and an oxidant supplier.

The electricity generating element includes the membrane-electrode assembly according to one embodiment and separators (also referred to as bipolar plates). The electricity generating element plays a role of generating electricity through an oxidation reaction of a fuel and a reduction reaction of an oxidant.

The fuel supplier plays a role of supplying the electrical generator with a fuel including hydrogen, and the oxidant supplier plays a role of supplying the electrical generator with an oxidant. The oxidant includes oxygen or air.

The fuel may include gas or liquid hydrogen or hydrocarbon fuel. Examples of the hydrocarbon fuel may be methanol, ethanol, propanol, butanol, or natural gas.

Figure 3:
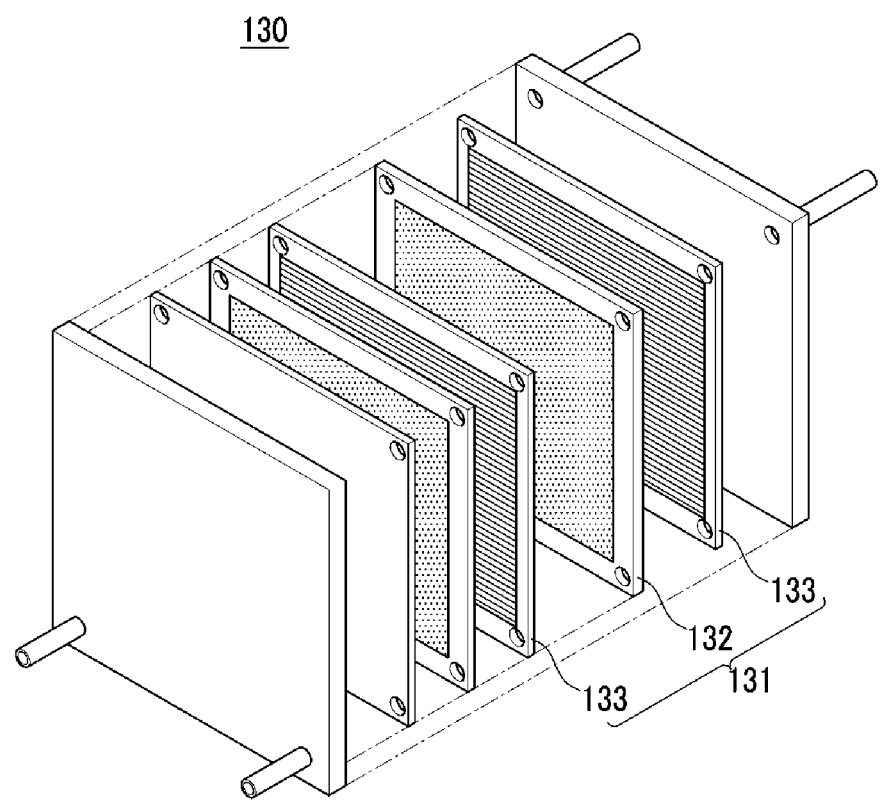
FIG. 3 is an exploded perspective view showing a fuel cell stack according to one embodiment.

The fuel cell includes a stack to generate electrical energy through a electrochemical reaction of hydrogen gas with an oxidant. Referring to FIG. 3, the stack is described.

FIG. 3 is an exploded perspective view of a fuel cell stack according to one embodiment.

Referring to FIG. 3, the stack 130 includes a plurality of unit cell 131 to generate electrical energy through an oxidation/reduction reaction of a fuel gas (e.g., hydrogen gas) and an oxidant (e.g., oxygen).

Each unit cell 131 is an electricity-generating unit cell, that is an electricity generating element, and includes a membrane-electrode assembly 132 to oxidize/reduce a fuel gas and an oxidant, and separators (or bipolar plates) 133 for supplying a fuel gas and an oxidant to the membrane-electrode assembly 132. The membrane-electrode assembly 132 is the same as described above. The separators 133 are disposed on the both sides of the membrane-electrode assembly 132. Herein, separators positioned at the outmost side of the stack are particularly referred to an end plate.

Hereinafter, the embodiments are illustrated in more detail with reference to examples. However, it is understood that the disclosure is not limited by these examples.

Example 1

Polyarylene ether sulfone of Chemical Formula 13 (PAES63, a weight average molecular weight (Mw): 170,200, a number average molecular weight (Mn): 42,200) was prepared by reacting biphenol of Chemical Formula 10, difluorodiphenyl sulfone of Chemical Formula 11, and sulfonated difluorophenylsulfone sodium salt of Chemical Formula 12 in a mole ratio of 100:35:65 in a mixed solvent of N-methylpyrrolidone and toluene (2:1 of a volume ratio) under $K_2CO_3$ at 150° C. for 5 hours and at 190° C. for 48 hours.

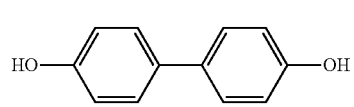

[Chemical Formula 10]

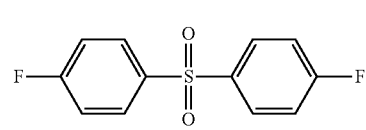

[Chemical Formula 11]

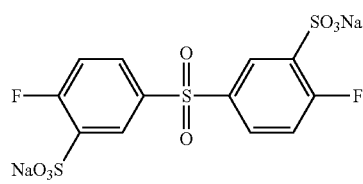

[Chemical Formula 12]

[Chemical Formula 13]

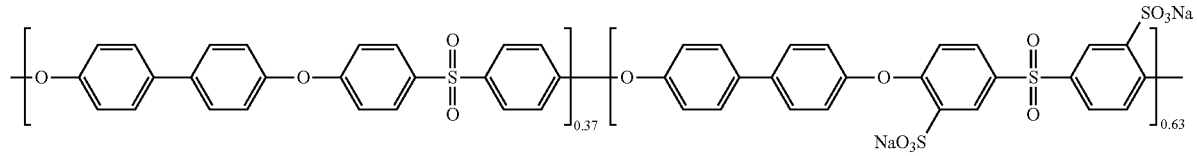

Then, 3-(3-hydroxyphenoxy)phenol) of Chemical Formula 14 was added to the polyarylene ether sulfone of Chemical Formula 13 in a ratio of 300 mol %:100 mol % under the presence of a mixed solvent of N-methylpyrrolidone and toluene (2:1 of a volume ratio) and $K_2CO_3$, and the mixture was reacted at 145° C. for 4 hours and at 180° C. for 12 hours, preparing a polymer of Chemical Formula 15(OH-PAES63).

under the presence of N-methylpyrrolidone solvent and $K_2CO_3$, a 1 mol/L sulfuric acid aqueous solution was added to the mixture, and the obtained mixture was reacted at 60° C. for 12 hours, preparing a polymer of Chemical Formula 19 (SH-PAES63). Herein, the 4,4'-thiobisbenzenethiol of Chemical Formula 18 was used in an amount of 200 mol % based on 100 mol % of the polymer of Chemical Formula 17.

[Chemical Formula 14]

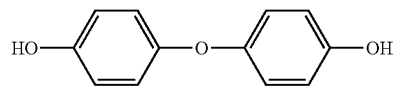

[Chemical Formula 15]

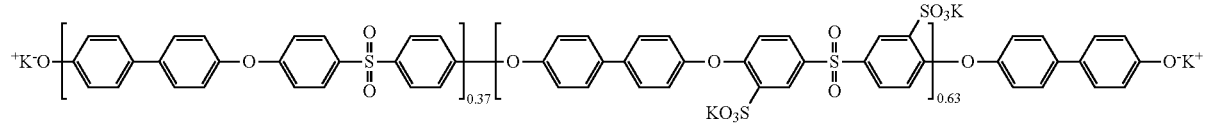

Then, decafluoro biphenyl of Chemical Formula 16 was added to the polymer of Chemical Formula 15 in a mole ratio of 3:1 under the presence of a mixed solvent of N-methylpyrrolidone and toluene (2:1 of a volume ratio) and $K_2CO_3$, and the mixture was reacted at 145° C. for 4 hours and at 180° C. for 12 hours, preparing a polymer of Chemical Formula 17 (DFBP-PAES63).

[Chemical Formula 16]

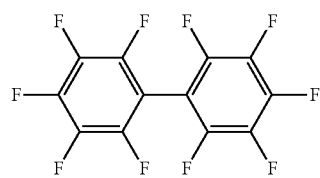

[Chemical Formula 17]

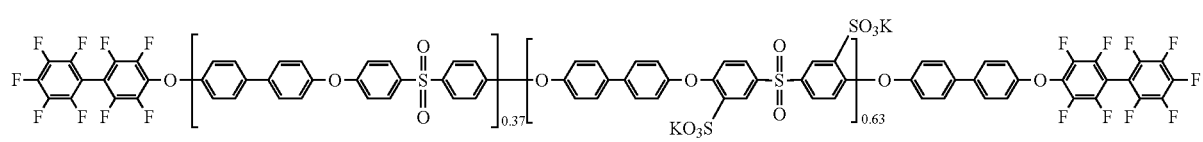

Subsequently, 4,4'-thiobisbenzenethiol of Chemical Formula 18 was added to the polymer of Chemical Formula 17

[Chemical Formula 18]

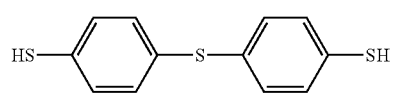

[Chemical Formula 19]

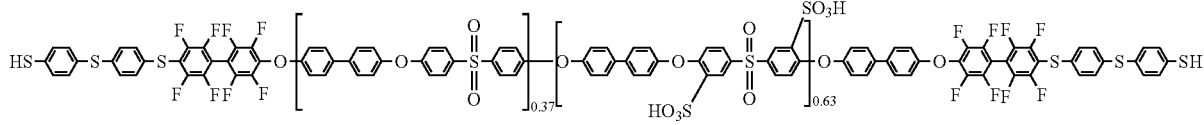

The polymer of Chemical Formula 19 and polyhedral oligomeric silsequioxane of Chemical Formula 1 were mixed with a dimethyl acetate solvent at 60° C., preparing a polymer electrolyte membrane composition. Herein, the polyhedral oligomeric silsequioxane of Chemical Formula 1 was used in an amount of 10 mol % based on 100 mol % of Chemical Formula 19.

[Chemical Formula 1]

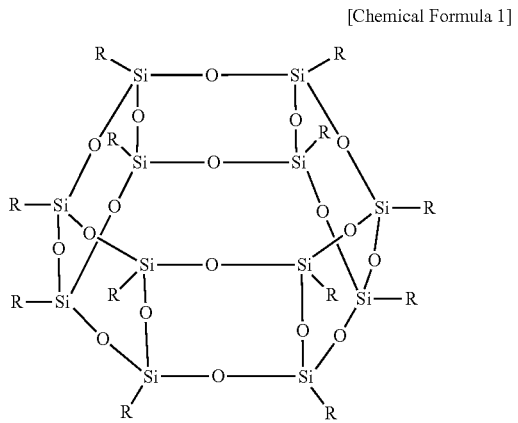

In Chemical Formula 1, R is Chemical Formula 1a.

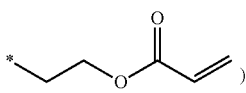 [SMILES: *CCOC(=O)C=C]

The polymer electrolyte membrane composition was cast to prepare a film, and the film was heat-treated at 130° C. for 12 hours, forming a 10 μm-thick polymer electrolyte membrane. During this heat treatment, the SH of the polymer of Chemical Formula 19 and the carbon-carbon double bond of Chemical Formula 1 are cross-linked and forms a cross-linking polymer, manufacturing a cross-linking type polymer electrolyte membrane. The polymer electrolyte membrane had ion exchange capacity (IEC) of about 1.95 meq/g.

Comparative Example 1

The polyhedral oligomeric silsequioxane of Chemical Formula 1 was mixed with the compound of Chemical Formula 19 in a ratio of 90 mol %:10 mol % in a dimethylacetate solvent, and this mixture was coated to form a membrane. This membrane was heat-treated at 130° C. for 12 hours, forming a 10 μm-thick polymer electrolyte membrane. Comparative Example 1 used no cross-linking agent, and no cross-linking reaction occurred during the heat treatment.

Comparative Example 2

The compound of Chemical Formula 19 was added to a dimethylacetate solvent, and the mixture was coated to form a membrane. The membrane was heated at 130° C. for 12 hours, manufacturing a 10 μm-thick polymer electrolyte membrane.

Figure 4:
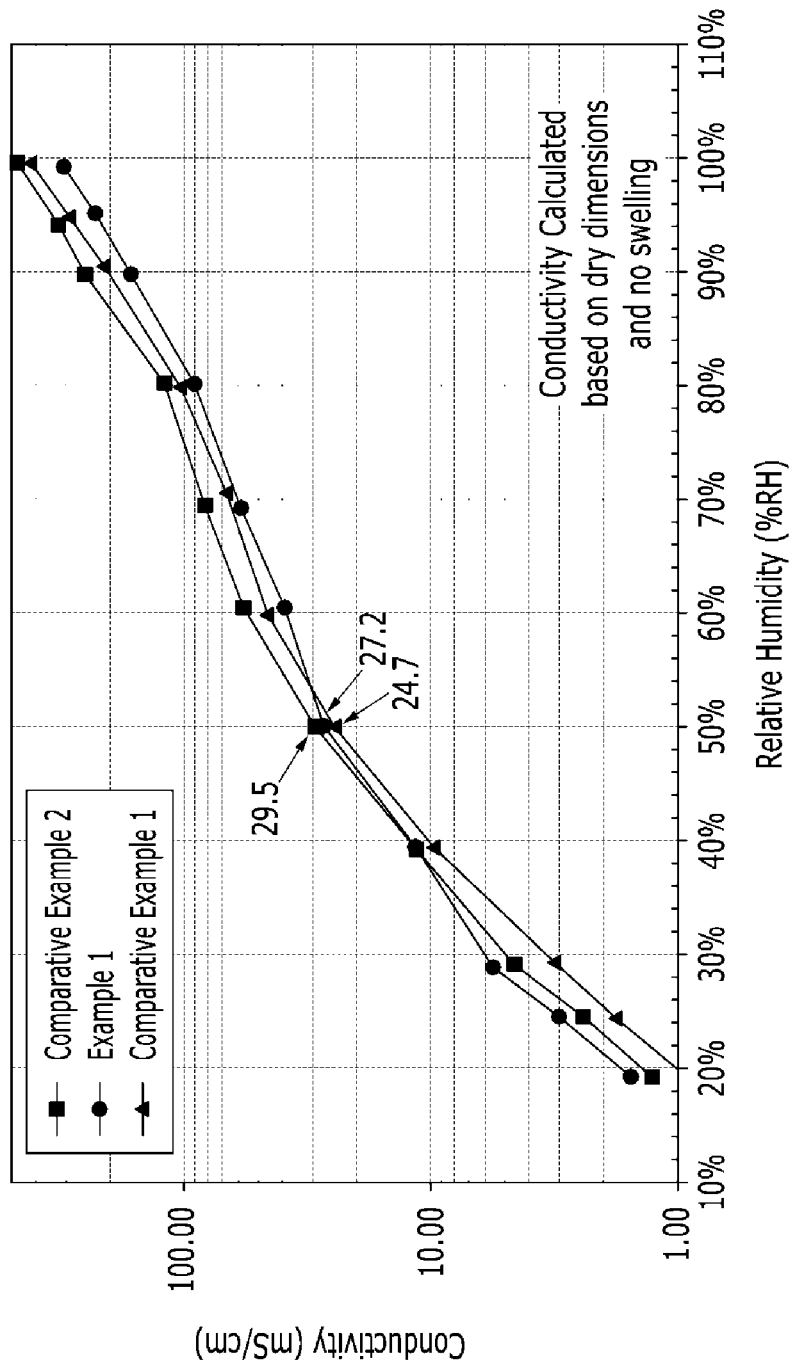
FIG. 4 is a graph showing proton conductivity of the polymer electrolyte membranes according to Example 1 and Comparative Examples 1 and 2 while changing relative humidity.

Proton conductivity of the polymer electrolyte membranes according to Example 1 and Comparative Examples 1 and 2 was measured while changing relative humidity, and the results were shown in FIG. 4. As shown in FIG. 4, Example 1 and Comparative Examples 1 to 2 showed almost the same ion conductivity, but Example 1 cross-linking the compound of Chemical Formula 19 and the polyhedral oligomeric silsequioxane of Chemical Formula 1 showed a little higher ion conductivity than Comparative Example 1 using a simple mixture of the compound of Chemical Formula 19 and the polyhedral oligomeric silsequioxane of Chemical Formula 1.

Hot Water Swelling Ratio

The polymer electrolyte membranes according to Example 1 and Comparative Examples 1 to 2 were respectively dipped in water and maintained at 95° C. for 24 hours. The polymer electrolyte membranes were measured regarding an initial length, width, thickness, area and volume and another length, width, thickness, area and volume after maintained at 95° C. for 24 hours, each increase length, width, thickness, area and volume increase rate (%) was calculated, and the results are provided in Table 1.

TABLE 1

| | Dimensional change (%) | | | | |
|---|---|---|---|---|---|
| | Length increase ratio | Width increase ratio | Thickness increase ratio | Area increase ratio | Volume increase ratio |
| Comparative Example 2 | 74.0 | 80.0 | 279.3 | 213.2 | 1088.0 |
| Example 1 | 38.0 | 62.0 | 50.0 | 123.6 | 235.3 |
| Comparative Example 1 | 64.0 | 60.0 | 268.7 | 162.4 | 867.6 |

As shown in Table 1, the polymer electrolyte membrane of Example 1 showed remarkably low length, width, thickness, area and volume increase rate at a high temperature compared with Comparative Examples 1 and 2. The result shows that the polymer electrolyte of Example 1 had excellent dimensional stability.

Chemical Durability
Fenton Test

A Fenton test is an acceleration experiment performed to evaluate time taken until the polymer electrolyte membrane was decomposed by a radical by dipping it in a solution in which a large amount of a hydroxy radical was produced under a strong oxidization condition. The test evaluates the time taken until the membrane was decomposed due the attack of the radical.

The polymer electrolyte membranes according to Example 1 and Comparative Example 1 to 2 were respectively dipped in a Fenton's reagent at 70° C. and measured regarding time that the polymer electrolyte membranes started to be broken and completely dissolved, and the results are provided as τ1 and τ2 in Table 2. As the Fenton's reagent, a H$_2$O$_2$ aqueous solution including 4 ppm FeSO$_4$ in a concentration of 3% was used.

2) Gel Fraction Test

The polymer electrolyte membranes according to Example 1 and Comparative Examples 1 to 2 were respectively dipped in a dimethylacetate solvent at 80° C. for 1 hour and then, measured regarding a solid content, and the results are provided in Table 2.

TABLE 2

|  | τ1 (min) | τ2 (min) | Gel fraction (solid wt %) |
|---|---|---|---|
| Comparative Example 1 | 215 | 350 | 0 |
| Example 1 | 410 | 540 | 46.3 |
| Comparative Example 2 | 190 | 315 | 0 |

As shown in Table 2, the polymer electrolyte membrane of Example 1 took a longer time until it was broken or completely decomposed than Comparative Examples 1 and 2. The Fenton test is an acceleration test to evaluate time taken until the polymer electrolyte membranes were dipped in a solution where a large amount of a hydroxy radical was produced under a strong oxidization condition and then, decomposed by the radical and tells chemical stability of the polymer electrolyte membranes. As shown in Table 2, the polymer electrolyte membrane of Example 1 showed larger τ1 and τ2 than those of Comparative Examples 1 and 2 and resultantly, excellent chemical stability.

In addition, the polymer electrolyte membrane according to Example 1 showed a solid content of 43 wt % and thus low solubility in dimethyl acetate, while the polymer electrolyte membranes according to Comparative Examples 1 and 2 showed a solid content of 0 wt %, that is, were completely dissolved in dimethyl acetate. In general, considering that a cross-linked polymer is not dissolved, while a linear polymer is all dissolved in dimethyl acetate very fast, the polymer electrolyte membrane according to Example 1 was confirmed to be a cross-linking type polymer electrolyte membrane. In addition, this result shows that the polymer electrolyte membrane according to Example 1 was chemically more stable than the polymer electrolyte membranes according to Comparative Examples 1 and 2.

Tensile Strength Test

Figure 5:
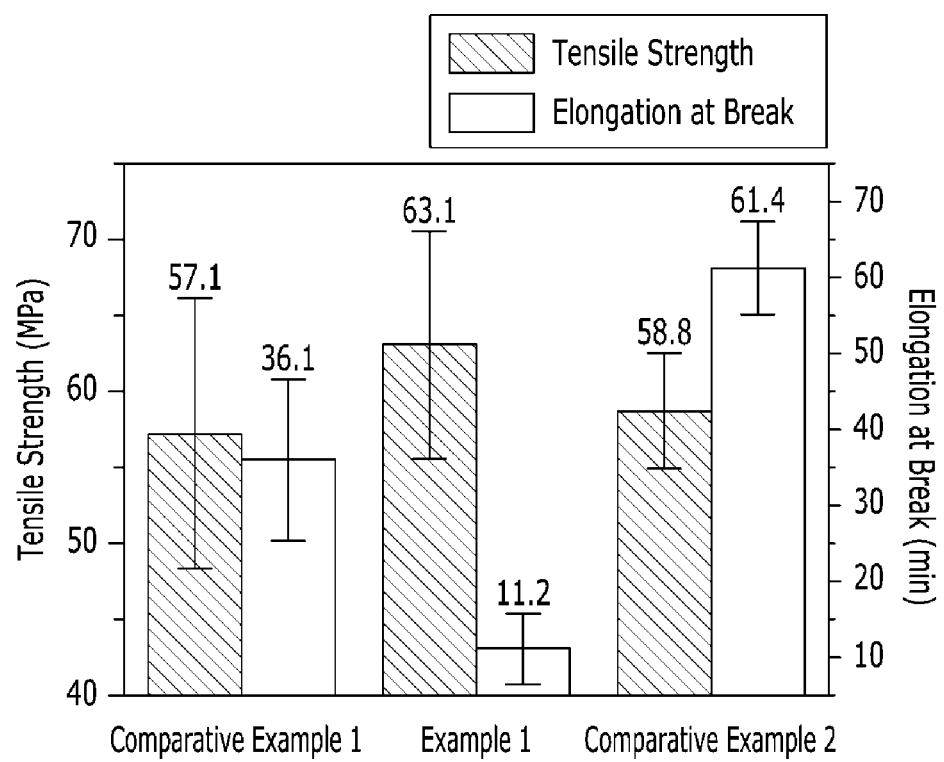
FIG. 5 is a graph showing tensile strength and elongation at break of the polymer electrolyte membranes according to Example 1 and Comparative Examples 1 to 2.

Tensile strength and elongation at break of the polymer electrolyte membranes according to Example 1 and Comparative Examples 1 to 2 were measured and the results were shown in FIG. 5.

The tensile strength and elongation at break were measured as follows.

Five specimens were prepared according to an ASTM standard D638 (Type V specimens) condition by using the polymer electrolyte membrane.

The specimens were measured regarding tensile strength and elongation at break at 26° C. under relative humidity (RH) of 40% at a speed of 5 mm/min by using Lloyd LR-10K (Lloyd, UK). The measurements were averaged, and the results are provided in FIG. 5.

As shown in FIG. 5, the polymer electrolyte membrane according to Example 1 showed excellent tensile strength compared with the polymer electrolyte membranes according to Comparative Examples 1 and 2. In addition, as shown in FIG. 5, the polymer electrolyte membrane according to Example 1 showed low elongation at break and thus low elongation and resultantly increase strength compared with the polymer electrolyte membranes according to Comparative Examples 1 and 2.

Example 2

Polyarylene ether sulfone of Chemical Formula 13a (PAES67, a weight average molecular weight (Mw): 47,900, a number average molecular weight (Mn): 14,600) was prepared according to the same method as Example 1 except for using biphenol of Chemical Formula 10, difluorodiphenyl sulfone of Chemical Formula 11, and sulfonated difluorodihalophenylsulfone of Chemical Formula 12 in a mole ratio of 100:35:65.

[Chemical Formula 13a]

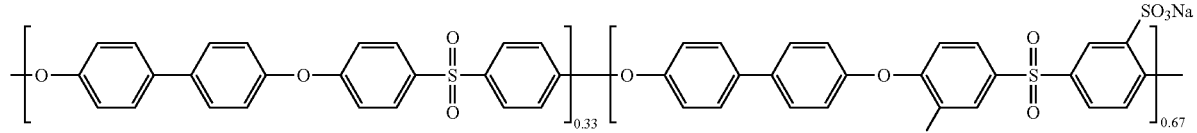

Polyarylene ether sulfone of Chemical Formula 13a and the 3-(3-hydroxyphenoxy)phenol) of Chemical Formula 14 used in Example 1 were reacted according to the same method as Example 1, preparing a polymer (OH-PAES7) of Chemical Formula 15a.

[Chemical Formula 15a]

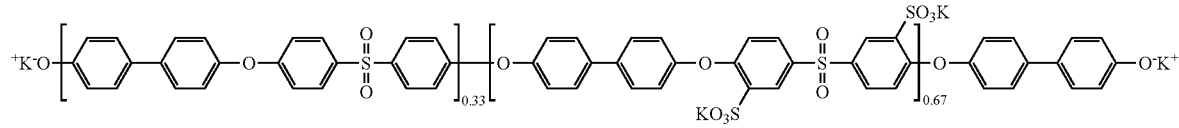

The polymer of Chemical Formula 15a and the decafluoro biphenyl of Chemical Formula 16 used in Example 1 were reacted according to the same method as Example 1, preparing a polymer of Chemical Formula 17a (DFBP-PAES67).

[Chemical Formula 17a]

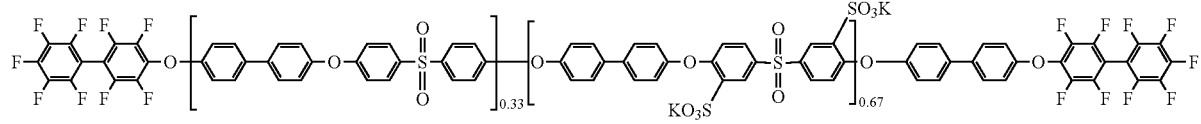

The polymer of Chemical Formula 17a and 4,4'-thiobis-benzenethiol of Chemical Formula 18 used in Example 1 were reacted according to the same method as Example 1, preparing a polymer of Chemical Formula 19a (SH-PAES67).

[Chemical Formula 19a]

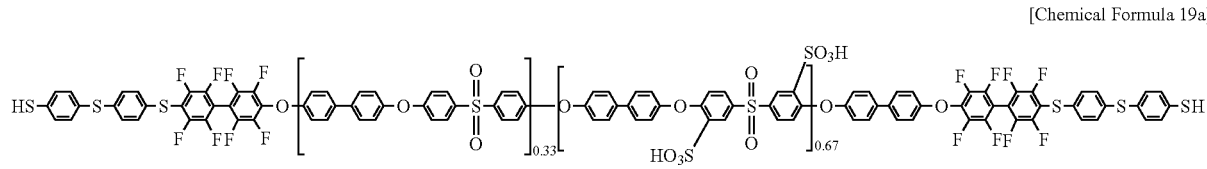

Figure 6:
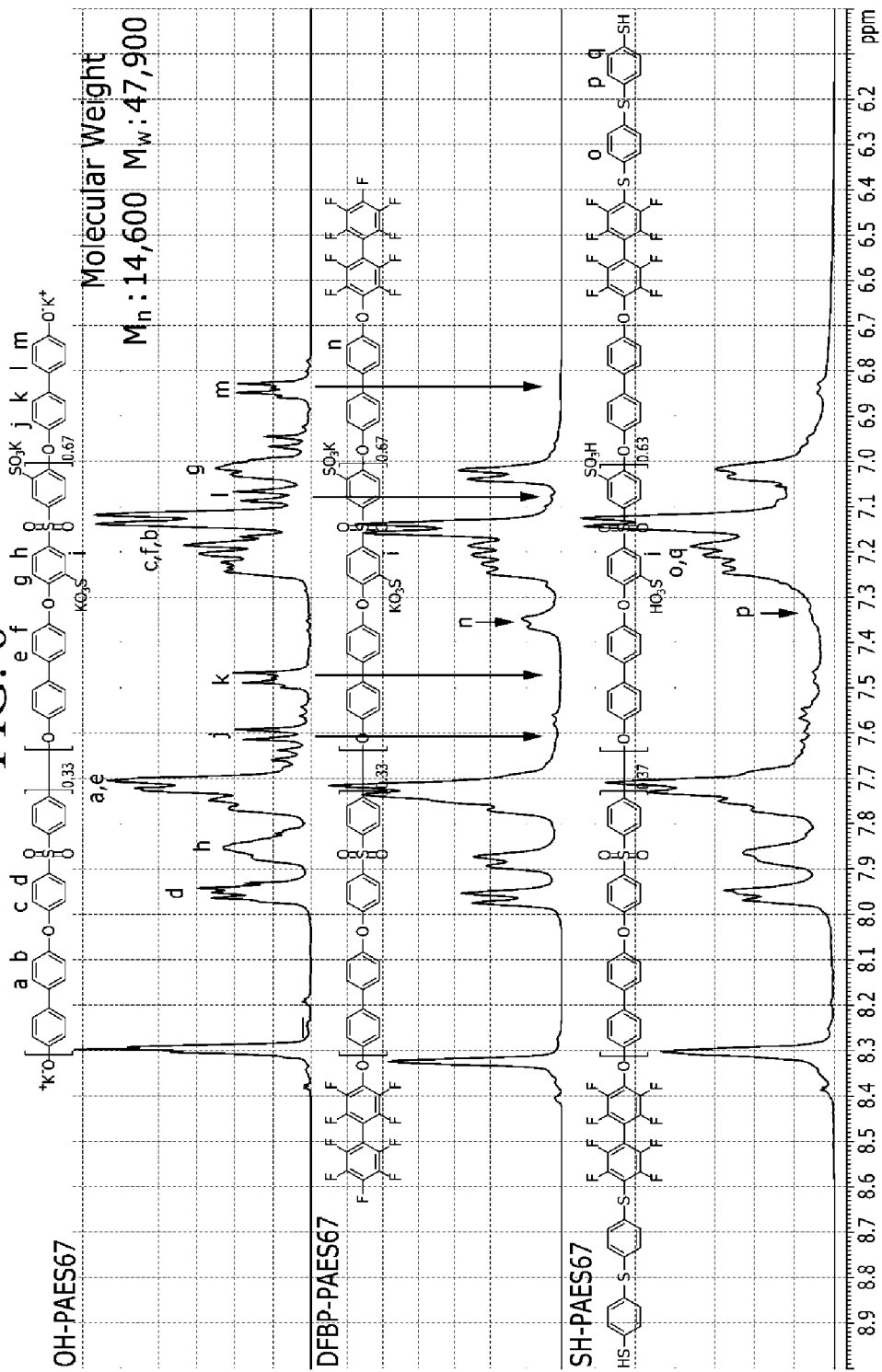
FIG. 6 is a graph showing NMR measurement results of products of each step in Example 2.

In order to find whether the OH-PAES67, DFBP-PAES67, and SH-PAES67 were formed in the process, NMR of OH-PAES67, DFBP-PAES67, and SH-PAES67 obtained in each step was measured, and the results are shown in FIG. 6.

The polymer of Chemical Formula 19a was mixed with the polyhedral oligomeric silsequioxane of Chemical Formula 1 and then, with a dimethyl acetate solvent, and this mixture was mixed at 60° C., preparing a polymer electrolyte membrane composition. Herein, the polymer of Chemical Formula 19a was used in an amount of 10 mol % based on 100 mol % of the polyhedral oligomeric silsequioxane of Chemical Formula 1.

The polymer composition was coated and heat-treated at 130° C. for 12 hours, forming a 10 μm-thick polymer electrolyte membrane. During the heat treatment, the SH of the polymer of Chemical Formula 19a and the carbon-carbon double bond of Chemical Formula 1 were cross-linked and formed a cross-linking polymer, preparing a cross-linking type polymer electrolyte membrane. The polymer electrolyte membrane had ion exchange capacity (IEC) of about 2.08 meq/g.

Example 3

A cross-linking type polymer electrolyte membrane was prepared according to the same method as Example 2 except for using the polymer of Chemical Formula 19a and the polyhedral oligomeric silsequioxane of Chemical Formula 1 in a ratio of 80 mol %:20 mol %.

Comparative Example 3

The compound of Chemical Formula 19a was added to a dimethylacetate solvent, and this mixture was coated to form a membrane. This membrane was heat treated at 130° C. for 12 hours, forming a 10 μm-thick polymer electrolyte membrane.

FR-IR Measurement

Figure 7:
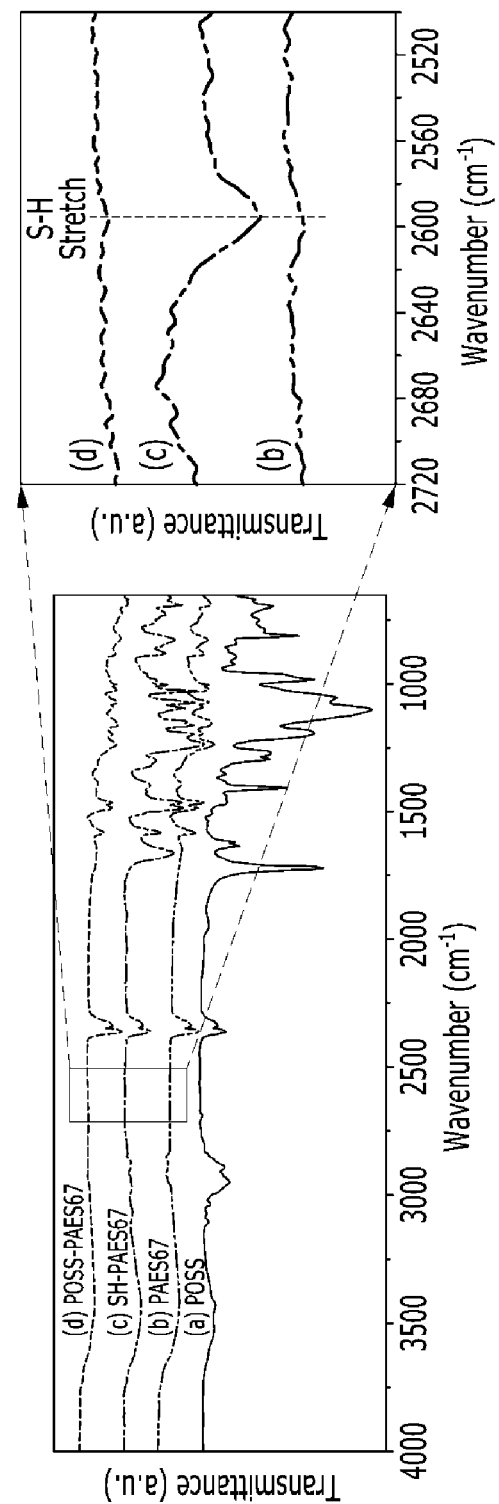
FIG. 7 is a graph showing FT-IR of products of each step in Example 2 and a partly enlarged graph showing tensile strength and elongation at break.

FT-IR of (a) POSS, (b) PAES67, (c) SH-PAES67, and (d) POSS-PAES67 obtained in each step of the manufacturing process of Example 2 was measured, and the results are provided in FIG. 7, and FIG. 7 shows a graph enlarging the results of (b) PAES67, (c) SH-PAES67, and (d) POSS-PAES67 in a region of 2000 $cm^{-1}$ to 3000 $cm^{-1}$.

As shown in FIG. 7, (c) SH-PAES67 with which a SH group was boned showed a peak derived from SH, but (d) POSS-PAES67 as a final product showed no peak derived from SH like (b) PAES67 as a starting material. This result shows that no SH group remained in the final product of POSS-PAES7, since the carbon-carbon double bond of POSS and the SH group of SH-PAES67 were cross-linked in a reaction of the POSS and the SH-PAES67.

Proton Conductivity

Figure 8:
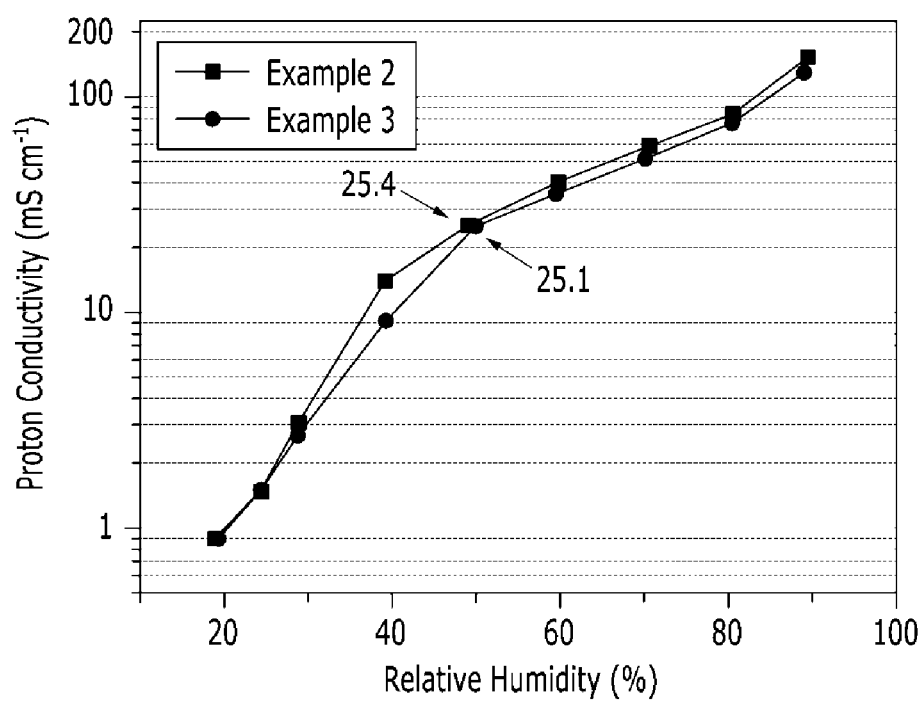
FIG. 8 is a graph showing proton conductivity of the polymer electrolyte membranes according to Examples 2 and 3 while changing relative humidity.

Proton conductivity of the polymer electrolyte membranes according to Examples 2 and 3 was measured while relative humidity was changed, and the results were shown in FIG. 8. As shown in FIG. 8, Example 2 showed proton conductivity of 25.4 $mScm^{-1}$, and Example 3 showed 25.1 $mScm^{-1}$ under relative humidity of 50%, and accordingly, the polymer electrolyte membranes according to Examples 2 and 3 was confirmed to be usefully used for a fuel cell under low relative humidity of 50%. The polymer electrolyte membrane according to Comparative Example 2 was dissolved at 90° C. under a condition of measuring proton conductivity and could not be measured regarding conductivity.

Mechanical Strength

Figure 9:
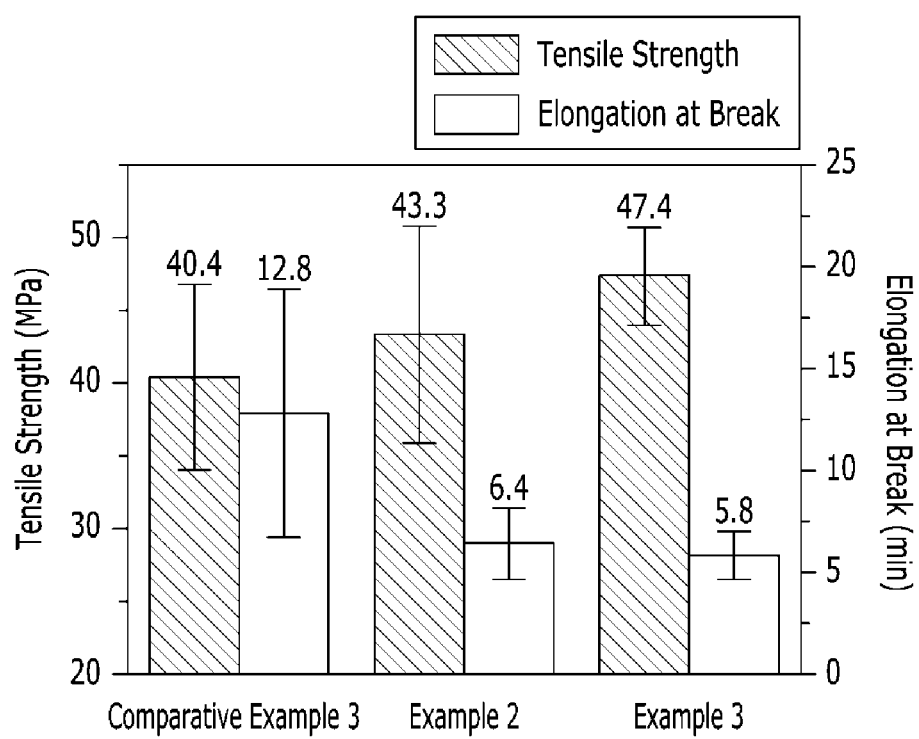
FIG. 9 is a graph showing tensile strength and elongation at break of the polymer electrolyte membranes according to Examples 2 and 3 and Comparative Example 3.

The polymer electrolyte membranes according to Examples 2 and 3 and Comparative Example 3 were measured regarding tensile strength and elongation at break, and the results are provided in FIG. 9. As shown in FIG. 9, the polymer electrolyte membranes according to Examples 2 and 3 showed higher tensile strength than that of Comparative Example 3 and low elongation at break.

Hot Water Swelling Ratio

The polymer electrolyte membranes according to Examples 2 to 3 and Comparative Example 3 were respectively dipped in water and maintained at 95° C. for 24 hours. The polymer electrolyte membranes were measured regarding initial length, width, thickness, area, and volume and another length, width, thickness, area, and volume after maintained at 95° C. for 24 hours, then, each length, width, thickness, area, and volume increase rate (%) was calculated, and the results are provided in Table 3.

TABLE 3

| | Dimensional change (%) | | | | |
|---|---|---|---|---|---|
| | Length increase ratio | Width increase ratio | Thickness increase ratio | Area increase ratio | Volume increase ratio |
| Comparative Example 3 | — | — | — | — | — |
| Example 2 | 49.6 | 50.0 | 29.4 | 124.4 | 190.4 |
| Example 3 | 41.2 | 48.0 | 33.7 | 108.9 | 179.3 |

In Table 3, the polymer electrolyte membrane according to Comparative Example 3 was excessively swollen at a high temperature, that is, almost collapsed and thus could not be measured regarding a length, width, thickness, area, and volume increase rate. On the contrary, the polymer electrolytes according to Examples 2 and 3 showed excellent dimensional stability.

Chemical Durability

Fenton Test

Figure 10:
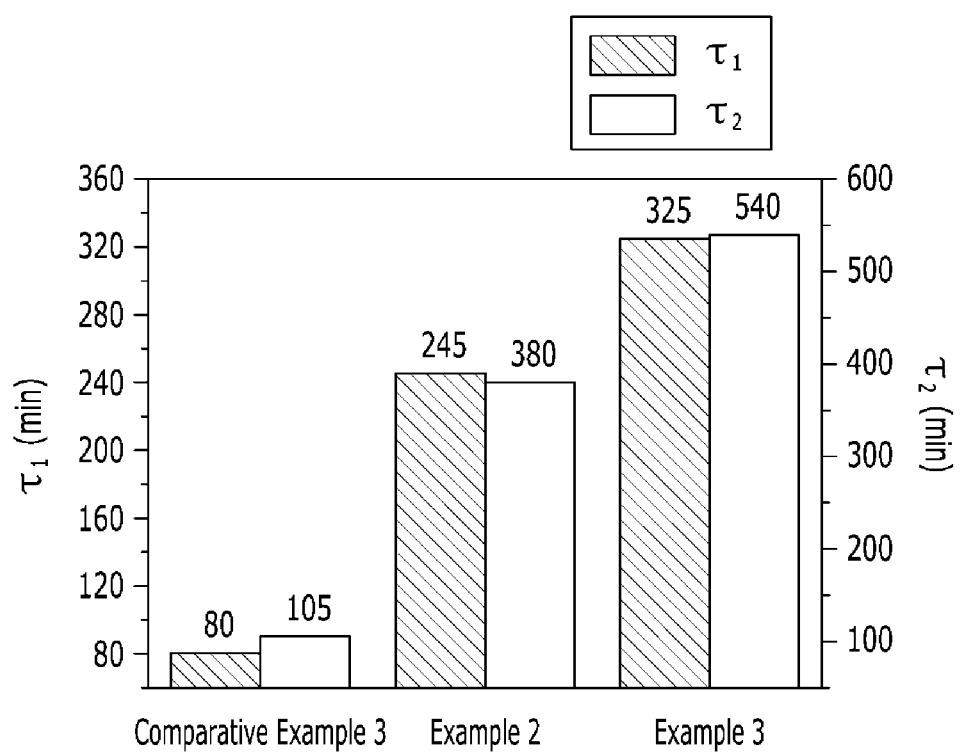
FIG. 10 is a graph showing Fenton test results of the polymer electrolyte membranes according to Examples 2 to 3 and Comparative Example 3.

The polymer electrolyte membranes according to Examples 2 to 3 and Comparative Example 3 were respectively dipped in a Fenton's reagent at 70° C. and measured regarding time taken until the polymer electrolyte membranes started to be broken and completely dissolved, and the results are provided as τ1 and τ2 in FIG. 10. As for the Fenton's reagent, a $H_2O_2$ aqueous solution including 4 ppm $FeSO_4$ in a concentration of 3% was used.

As shown in FIG. 10, the polymer electrolyte membranes according to Examples 2 and 3 took longer time until broken or completely dissolved and thus were chemically more stable than that of Comparative Example 3.

2) Gel Fraction Test

The polymer electrolyte membranes according to Examples 2 and 3 and Comparative Example 3 were respectively dipped in a dimethylacetate solvent at 80° C. for 1 hour, then, their solid contents were measured, and the results are provided in Table 4.

TABLE 4

| | Gel fraction (solid wt %) |
|---|---|
| Comparative Example 3 | 0 |
| Example 2 | 76.5 |
| Example 3 | 81.7 |

As shown in Table 4, the polymer electrolyte membranes according to Examples 2 and 3 showed each solid content of 76.5 wt % and 81.7 wt % and low solubility in dimethyl acetate and resultantly, were chemically more stable than the polymer electrolyte membrane of Comparative Example 3 showed a solid content of 0 wt %, that is, was completely dissolved in the dimethyl acetate.

While these embodiments have been described in connection with what is presently considered to be practical example embodiments, it is to be understood that these embodiments are not limited to the disclosed embodiments, but, on the contrary, is intended to cover various modifications and equivalent arrangements included within the spirit and scope of the appended claims. Therefore, the aforementioned embodiments should be understood to be examples but not limiting the present embodiments in any way.

What is claimed is:

1. A polymer electrolyte membrane for a fuel cell comprising:

a cross-linking polymer comprising: a polyhedral oligomeric silsequioxane (POSS) cross-linked with a hydrocarbon-based polymer, wherein the polyhedral oligomeric silsequioxane is represented by Chemical Formula 1 or 2:

[Chemical Formula 1]

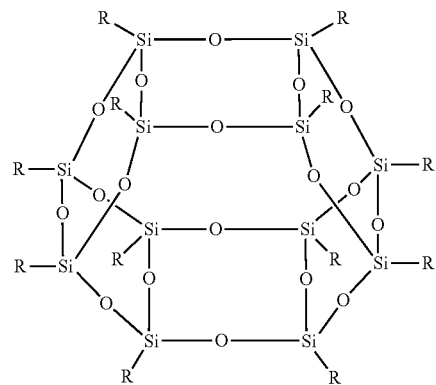

[Chemical Formula 2]

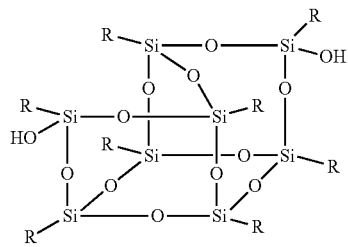

wherein,

R is Chemical Formula 1a,

[Chemical Formula 1a]

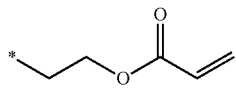

wherein, ** indicates a binding site where it is bound to Chemical Formula 1 or 2, and wherein the hydrocarbon-based polymer comprises a repeating unit represented by Chemical Formula 3:

[Chemical Formula 3]

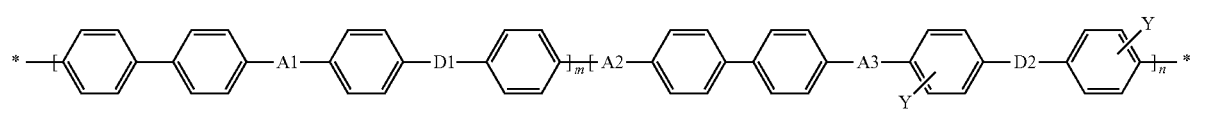

wherein,

A1, A2, and A3 are the same or different and are independently O or S,

D1 and D2 are the same or different and are independently SO$_2$, O, or S,

Y is a substituted or unsubstituted proton conductive group, n is a real number of 0.2 to 1, and m is 1-n.

2. The polymer electrolyte membrane of claim 1, wherein the cross-linking polymer does not have a peak in about 2400 cm$^{-1}$ to about 2800 cm$^{-1}$ in a FT-IR analysis.

3. The polymer electrolyte membrane of claim 1, wherein the hydrocarbon-based polymer has a weight average molecular weight (Mw) of about 20,000 to about 300,000.

4. The polymer electrolyte membrane of claim 1, wherein the cross-linking polymer has solubility for dimethylacetate of about 40 wt % to about 90 wt %.

5. The polymer electrolyte membrane of claim 1, wherein the hydrocarbon-based polymer has at least one sulfonic acid group at a side chain.

6. The polymer electrolyte membrane of claim 1, wherein a thickness of the polymer electrolyte membrane is from about 5 μm to about 20 μm.

7. The polymer electrolyte membrane of claim 1, wherein an ion exchange capacity (IEC) of the polymer electrolyte membrane is from about 1.5 meq/g to about 3.5 meq/g.

8. The polymer electrolyte membrane of claim 1, wherein the cross-linking polymer comprises about 5 mol % to about 40 mol % of the polyhedral oligomeric silsequioxane based on 100 mol % of the cross-linking polymer.

9. A membrane-electrode assembly for a fuel cell comprising:

a polymer electrolyte membrane comprising a cross-linking polymer comprising:

a polyhedral oligomeric silsequioxane (POSS) cross-linked with a hydrocarbon-based polymer;

a cathode positioned on one side of the electrolyte membrane; and an anode positioned on the other side of the electrolyte membrane, wherein the polyhedral oligomeric silsequioxane is represented by Chemical Formula 1 or 2:

[Chemical Formula 1]

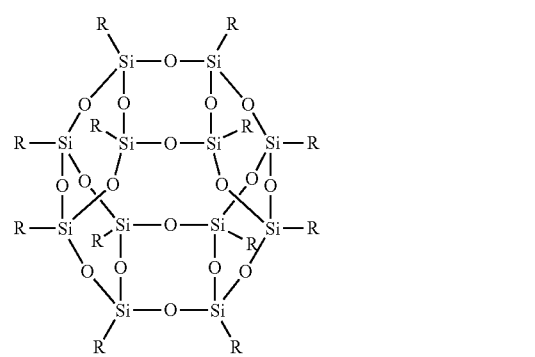

[Chemical Formula 2]

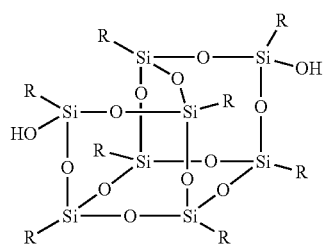

wherein,

R is Chemical Formula 1a,

[Chemical Formula 1a]

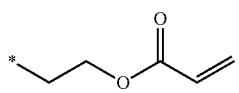

wherein, ** indicates a binding site where it is bound to Chemical Formula 1 or 2, and wherein the hydrocarbon-based polymer comprises a repeating unit represented by Chemical Formula 3:

[Chemical Formula 3]

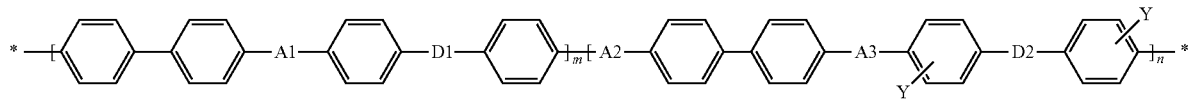

wherein,

A1, A2, and A3 are the same or different and are independently O or S,

D1 and D2 are the same or different and are independently $SO_2$, O, or S,

Y is a substituted or unsubstituted proton conductive group, n is a real number of 0.2 to 1, and m is 1-n.

10. The membrane-electrode assembly of claim 9, wherein the cross-linking polymer does not have a peak in about 2400 $cm^{-1}$ to about 2800 $cm^{-1}$ in a FT-IR analysis.

11. The membrane-electrode assembly of claim 9, wherein the hydrocarbon-based polymer has a weight average molecular weight (Mw) of about 20,000 to about 300,000.

12. The membrane-electrode assembly of claim 9, wherein the cross-linking polymer has solubility for dimethylacetate of about 40 wt % to about 90 wt %.

13. The membrane-electrode assembly of claim 9, wherein the hydrocarbon-based polymer has at least one sulfonic acid group at a side chain.

14. The membrane-electrode assembly of claim 9, wherein a thickness of the polymer electrolyte membrane is from about 5 μm to about 20 μm.

15. The membrane-electrode assembly of claim 9, wherein an ion exchange capacity (IEC) of the polymer electrolyte membrane is from about 1.5 meq/g to about 3.5 meq/g.

16. A fuel cell comprising at least one electricity generating element including the membrane-electrode assembly of claim 9 and separators positioned at both sides of the membrane-electrode assembly, and generating electricity through an oxidation reaction of a fuel and a reduction reaction of an oxidant;

a fuel supplier for supplying the fuel to the electricity generating element; and an oxidant supplier for supplying an oxidant to the electricity generating element.

\* \* \* \* \*